(12) United States Patent  
Huang

(10) Patent No.: US 7,255,097 B1  
(45) Date of Patent: Aug. 14, 2007

(54) METHOD FOR INCREASING PERFORMANCE OF AUTOMOBILE AND APPARATUS THEREOF

(76) Inventor: Ching-Tung Huang, No. 196, Lane 37, Jhongjheng Rd., Sinying City, Tainan County 730 (TW)

( * ) Notice: Subject to any disclaimer, the term of this patent is extended or adjusted under 35 U.S.C. 154(b) by 0 days.

(21) Appl. No.: 11/552,224

(22) Filed: Oct. 24, 2006

(51) Int. Cl.
*F02M 29/00* (2006.01)
*F02B 23/10* (2006.01)

(52) U.S. Cl. .................. 123/585; 123/184.61; 123/590
(58) Field of Classification Search ............... 123/585, 123/590, 592–593, 184.21, 184.53, 184.61; 285/238, 244
See application file for complete search history.

(56) References Cited

U.S. PATENT DOCUMENTS

| | | | | |
|---|---|---|---|---|
| 4,492,212 A * | 1/1985 | Dooley | ........................ | 123/590 |
| 4,515,138 A * | 5/1985 | Agadi | ........................ | 123/590 |
| 4,718,393 A * | 1/1988 | Bakish | ........................ | 123/593 |
| 5,429,102 A * | 7/1995 | Edwards et al. | ............ | 123/593 |
| 5,571,242 A * | 11/1996 | Demorest | .............. | 123/184.21 |
| 5,769,045 A * | 6/1998 | Edwards et al. | ....... | 123/184.61 |
| 5,769,059 A * | 6/1998 | Wallace et al. | .............. | 123/545 |
| 5,809,961 A * | 9/1998 | Morota et al. | ......... | 123/184.53 |
| 5,924,398 A * | 7/1999 | Choi | ..................... | 123/184.21 |
| 5,937,838 A * | 8/1999 | Harrell | ........................ | 123/593 |
| 5,970,963 A * | 10/1999 | Nakase et al. | ............... | 123/590 |
| 6,258,144 B1 * | 7/2001 | Huang | ........................ | 55/385.3 |
| 6,550,446 B1 * | 4/2003 | Robley, Jr. | .................. | 123/306 |
| 6,796,296 B2 * | 9/2004 | Kim | ............................ | 123/590 |
| 6,901,907 B2 * | 6/2005 | Wijaya | ........................ | 123/306 |
| 6,932,049 B2 * | 8/2005 | Kim | ............................ | 123/306 |
| 6,938,608 B2 * | 9/2005 | Wijaya | ........................ | 123/306 |
| 6,959,701 B2 * | 11/2005 | Zimmermann et al. | ..... | 123/590 |
| 6,966,292 B2 * | 11/2005 | Huang | .................... | 123/184.21 |
| 7,055,512 B2 * | 6/2006 | Leuenberger | ............... | 123/590 |
| 7,185,626 B2 * | 3/2007 | Huckelberry et al. | ....... | 123/306 |
| 2006/0196462 A1 * | 9/2006 | Quezada | ................ | 123/184.21 |
| 2006/0254567 A1 * | 11/2006 | Holtzman | ................... | 123/585 |
| 2007/0022996 A1 * | 2/2007 | Egan | ..................... | 123/184.53 |
| 2007/0028884 A1 * | 2/2007 | Atsumi | ................... | 123/184.53 |
| 2007/0044779 A1 * | 3/2007 | Green | ........................ | 123/585 |

* cited by examiner

*Primary Examiner*—Hai Huynh
(74) *Attorney, Agent, or Firm*—Alan Kamrath; Kamrath & Associates PA

(57) ABSTRACT

A method for increasing the performance of an automobile engine and apparatus thereof is provided, wherein both ends of a pipe interconnecting an idle motor and a throttle valve and an air filter are respectively connected to tubes made of rubber. The pipe is made of robust material. Air current resistance members are mounted in the pipe and each of the tube receives a spring. By using the method and apparatus, vortical flow is caused in the pipe so as to precipitate the flow of the air current and therefore enhance the performance of automobile.

5 Claims, 2 Drawing Sheets

METHOD FOR INCREASING PERFORMANCE OF AUTOMOBILE AND APPARATUS THEREOF

BACKGROUND OF THE INVENTION

1. Field of Invention

The invention relates to method and apparatus for increasing performance of an automobile and more particularly to provide a pipe apparatus interconnecting an idle motor and a throttle valve and air filter in a European automobile so as to cause air current to flow smoothly and relatively reduce wear of torque and horsepower of engine, reduce engine noise and increase an effect of environmental protection.

2. Related Art

In a conventional European automobile, an idle motor 10 is interconnected to a throttle valve 20 and an air filter 30 through a pipe 40 made of a rubber material, as shown in FIG. 1. A current of air 50, as indicated by arrows, flows from the idle motor 10 to the throttle valve 20 and the air filter 30 through the pipe 40.

However, since the pipe 40 is only a hollow soft pipe with a uniform diameter along the length thereof, the current of air 50 flows linearly in the pipe 40 and the flow speed is not fast. Thus, the need for improvement still exists.

SUMMARY OF THE INVENTION

In view of protecting the environment and to meet exhaust emission requirements for European automobiles, the inventor develops an apparatus for improving exhaust emission in European automobiles and for facilitating air current flows.

It is therefore an object of the present invention to provide a first tube made of rubber extending from an idle motor; a second tube made of rubber extending from a throttle valve and an air filter at the other end; a pipe made of robust material connecting the first and second tube; a plurality of air current resistance members mounted in the pipe, and a first and a second springs respectively anchored in the first and second tubes; and wherein an air current flows vortically in the pipe and the flow of the air current is precipitated.

The above and other objects, features and advantages of the present invention will become apparent from the following detailed description taken with the accompanying drawings.

DETAILED DESCRIPTION OF THE INVENTION

Figure 1:
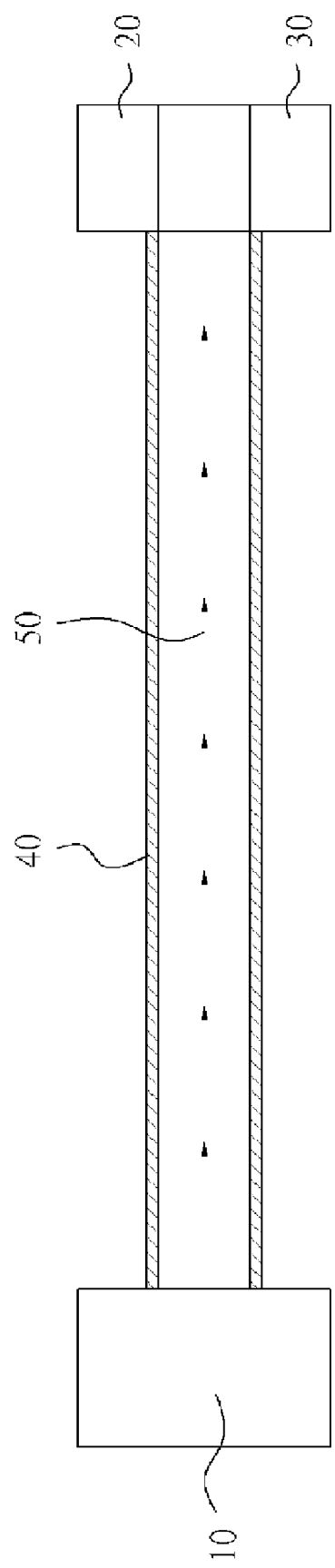
FIG. 1 is a schematic sectional view depicting a current of air flowing from an idle motor to a throttle valve and an air filter through a pipe when an automobile engine is running according to the prior art.
Figure 2:
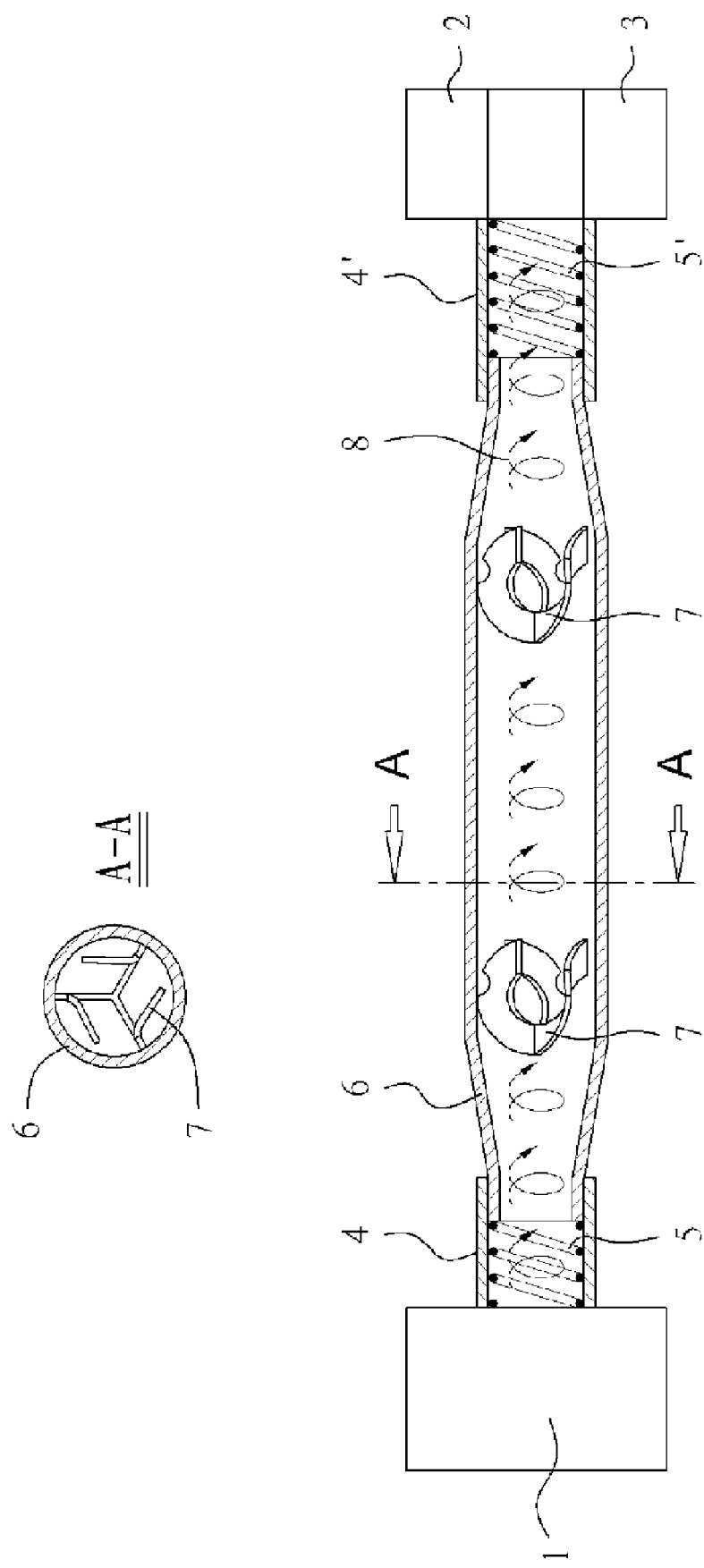
FIG. 2 is a schematic sectional view depicting a current of air flowing from an idle motor to a throttle valve and an air filter through a pipe when an automobile engine is running according to the present invention.

Referring to FIG. 2, a method for increasing performance of an automobile and an apparatus thereof according to the present invention directed to a novel design for a pipe apparatus connecting an idle motor 1 and the throttle valve 2 and the air filter 3 in an engine of a European automobile is shown. One end of a first tube 4 formed of rubber is connected to one side of the idle motor 1. A first spring 5 is anchored in the first tube 4 and against the inner tube wall of the first tube 4. The other end of the first tube 4 is connected to one end of a pipe 6 made of robust material. A plurality of air current resistance members 7 are mounted in the pipe 6. The other end of the pipe 6 is connected to one end of a second tube 4' formed of rubber. A second spring 5' is anchored in the second tube 4' and against the inner tube wall of the second tube 4'. The other end of the second tube 4' is connected to the throttle valve 2 and the air filter 3.

Air current 8 as indicated by arrows flows from the idle motor 1 to both the throttle valve 2 and the air filter 3 through the first tube 4, the pipe 6, and the second tube 4' when the engine is running. It is contemplated by the invention that the pipe apparatus proposed by the present invention cause the air current 8 in the pipe vortical so as to precipitate the flow of the air current 8 and therefore enhance the performance of automobile.

Preferably, the pipe 6 is made of either a heat-resistant, robust material or a metal material.

Further, by agitating the current as vortex, the invention has the following advantages including:

1) torque and horsepower of automobile is increased;
2) the performance of idle motors is increased;
3) compression ratio of engine is adjustable;
4) combustion efficiency of automobile is increase;
5) emission is improved; and
6) the performance of variable valve of engine is increased.

It is to be understood that the present invention is by no means limited only to the particular constructions herein disclosed and shown in the drawings, but also comprises any modifications or equivalents within the scope of the claims.

What is claimed is:

1. An apparatus for increasing performance of an automobile comprising:

a first tube made of rubber extending from an idle motor;
  a second tube made of rubber extending from a throttle valve and an air filter at the other end;
  a pipe made of robust material interconnecting the first and second tube;
  a plurality of air current resistance members mounted in the pipe, and
  a first and a second springs respectively anchored in the first and second tubes; and
  wherein an air current flows vortically in the pipe and the flow of the air current is precipitated.

2. The apparatus of claim 1, wherein the pipe made is formed of a heat-resistant and tough material.

3. The apparatus of claim 1, wherein the pipe is formed of metal.

4. The apparatus of claim 1, wherein the first and second springs are against inner walls of the first and second tubes respectively.

5. A method for increasing performance of an automobile, comprising the steps of:

providing a first tube made of rubber extending from an idle motor;
  providing a second tube made of rubber extending from a throttle valve and an air filter at the other end;
  providing a pipe made of robust material interconnecting the first and second tube;
  providing a plurality of air current resistance members mounted in the pipe, and
  providing a first and a second springs respectively anchored in the first and second tubes.

* * * * *